April 11, 1950     H. C. SUTHERLAND     2,503,525
ICE CREAM CONTAINER MOUTH GUIDE
Filed Sept. 27, 1948
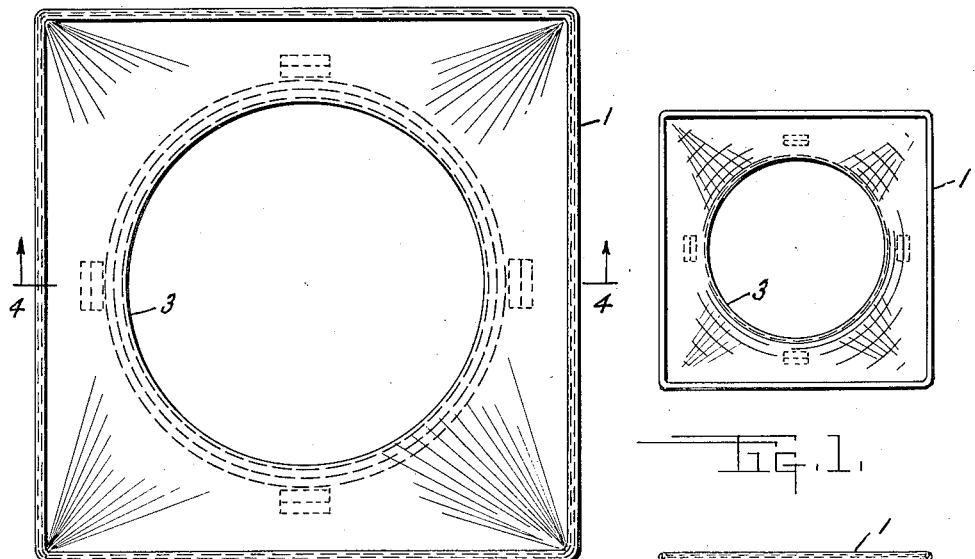
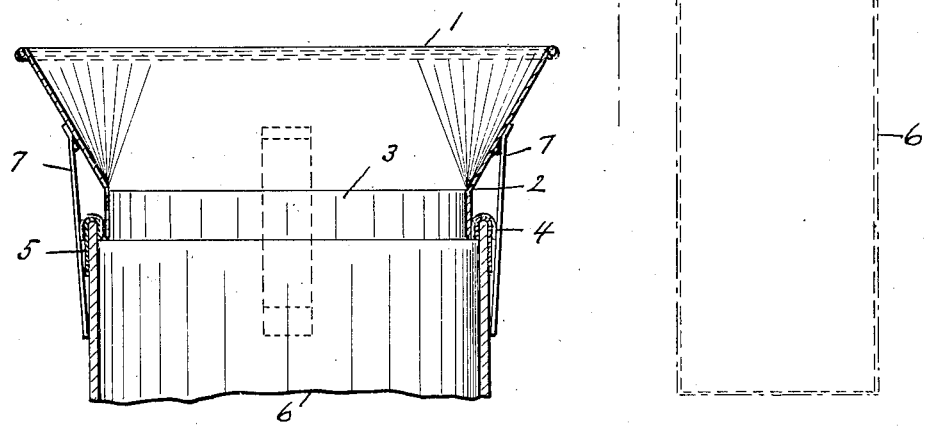
Howard C. Sutherland
INVENTOR.
BY Chas. Denegre
Attorney.

Patented Apr. 11, 1950

2,503,525

UNITED STATES PATENT OFFICE 2,503,525

ICE-CREAM CONTAINER MOUTH GUIDE

Howard C. Sutherland, Mobile, Ala., assignor of one-third to William Lindley and one-third to John F. N. Woolls, both of Olympia, Wash.

Application September 27, 1948, Serial No. 51,475

1 Claim. (Cl. 220—86)

This invention relates to an ice cream standard container mouth guide. It has for its main object to provide a device that will eliminate the waste of ice cream serving in retail sales of same in small quantities.

Further objects are to provide such a device that will be simple in structure, cheap to manufacture, easy to keep clean, highly efficient, and extremely durable.

At the present time ice cream for small retail sales is packed in standard round cardboard containers with metal ring or band top edges. The package is comparatively heavy and it is necessary for it to be placed in a large cold compartment adapted for several ice cream containers to be placed therein. To place the container for use the top is removed or cut out, the container is held between the hands of the server and let down gently into the main compartment with considerable space around the top portion of the container. In this condition the ice cream is dug out in small quantities in the shape of balls to serve to customers with the result that much is lost over the top edge of the container, especially so when the container is full or near full. The waste accumulates in the bottom of the main compartment. With the present invention placed on the container when it is opened for use the waste over the top of the container will be avoided as its wide mouth will catch the ice cream at the top of the container and fall back therein.

Other objects and advantages will appear from the drawing and description.

By referring generally to the drawing, part of this application, it will be observed that Fig. 1 is a plan view of the container mouth guide; Fig. 2 is a side view of the mouth guide mounted upon the container, and the compartment for the container indicated in fragmentary broken lines; Fig. 3 is an enlarged view of the container mouth guide; and Fig. 4 is a view on line 4—4 of Fig. 3 showing the guide mounted for use on the ice cream container of the standard type.

Similar reference numerals refer to similar parts throughout the several views.

Referring to the drawing in detail it will be seen that the device comprises substantially a funnel having a square top portion 1 converging into a circular bottom edge 2 attached to a band or collar 3. An inverted U-shaped channel 4 is attached to the lower edge of the collar. The channel is adapted to fit upon the top edge 5 of the ice cream container 6. Attached to the outer wall face of the guide are four metal strips 7 spaced apart for retaining the guide in proper position for use on the container. Three such strips may be used instead of four with satisfactory results. The top portion of the guide body is preferably made square because the compartments for holding the cream containers are generally provided with square openings.

The device may be made of any material suitable for the purpose, but I prefer to use suitable metal. Also it may be made in different sizes.

While I have shown and described the preferred embodiment of my invention, I do not wish to limit same to the exact and precise details of structure, but reserve the right to make all modifications and changes so long as they remain within the spirit and scope of the invention and the following claim.

Having described my invention I claim:

In a funnel type guide for use on an ice cream container comprising; a metal body having a substantially square top edge, the sides of the body converging from the top and toward a common center to form a round outlet, a stiff metal ring attached to the bottom edge of the body, an inverted U-shaped channel attached entirely around the outer bottom edge of the said ring, a plurality of metal strips attached by the end of each to the outer face of the wall of the body, each strip also attached at its middle portion to the outer edge of the said U-shaped channel, the other end of the strip extending below the bottom edge of the said metal ring on the bottom edge of the body.

HOWARD C. SUTHERLAND.

No references cited.